March 30, 1954 W. M. SMITH 2,673,932

VARIABLE FREQUENCY OSCILLATOR

Filed Oct. 31, 1946 7 Sheets-Sheet 1

WOLCOTT M. SMITH
INVENTOR

BY James + Franklin
ATTORNEY

WOLCOTT M. SMITH
INVENTOR
BY James & Franklin
ATTORNEY

March 30, 1954 W. M. SMITH 2,673,932
VARIABLE FREQUENCY OSCILLATOR
Filed Oct. 31, 1946 7 Sheets-Sheet 3

WOLCOTT M. SMITH
INVENTOR
BY James x Franklin
ATTORNEY

WOLCOTT M. SMITH
INVENTOR

BY James & Franklin
ATTORNEY

March 30, 1954 W. M. SMITH 2,673,932

VARIABLE FREQUENCY OSCILLATOR

Filed Oct. 31, 1946 7 Sheets-Sheet 5

① eG1 FROM G2
② eG1 FROM G4
③ eG1 FROM PLATE
④ eG1 = 0

WOLCOTT M. SMITH
INVENTOR

BY James & Franklin
ATTORNEY

WOLCOTT M. SMITH
INVENTOR

BY James Franklin
ATTORNEY

March 30, 1954 W. M. SMITH 2,673,932

VARIABLE FREQUENCY OSCILLATOR

Filed Oct. 31, 1946

7 Sheets-Sheet 7

WOLCOTT M. SMITH
INVENTOR

BY James & Franklin
ATTORNEY

Patented Mar. 30, 1954

2,673,932

UNITED STATES PATENT OFFICE 2,673,932

VARIABLE FREQUENCY OSCILLATOR

Wolcott Marsh Smith, Springfield, Mass., assignor, by mesne assignments, to General Instrument Corporation, Elizabeth, N. J., a corporation of New Jersey Application October 31, 1946, Serial No. 706,949

18 Claims. (Cl. 250—36)

This invention relates to an oscillator circuit, the frequency of oscillation of which may be varied instantaneously and over a relatively wide range in a simple manner.

This type of circuit is of particular value in frequency modulation transmitters, in which the frequency of the transmitted signal must vary in accordance with and proportionately to the variations in frequency of the sound intelligence to be transmitted thereby. With the circuit of the present invention a variable frequency oscillator has been produced which is of exceedingly simplified and economical construction, which employs but a single vacuum tube, and which attains an exceptionally high sensitivity of output frequency to variations in applied voltage, the output amplitude retaining a high degree of amplitude stability. The circuit of this invention is susceptible of taking several forms, each of which will achieve a specific objective either with regard to sensitivity or direction of response, range of frequency variation, or constancy of output amplitude. In addition, the output resulting from this circuit has been found to be exceedingly rich in harmonics, so much so that the amplitude of the lower harmonics is quite comparable to that of the fundamental. As a result of this feature, the flexibility of use of the circuit is increased exceedingly.

This circuit is disclosed in a schematic or generalized way in Fig. 1 of the drawings appended hereto, Fig. 1 showing $Zg$ connected to $G_2$;

Figure 1:
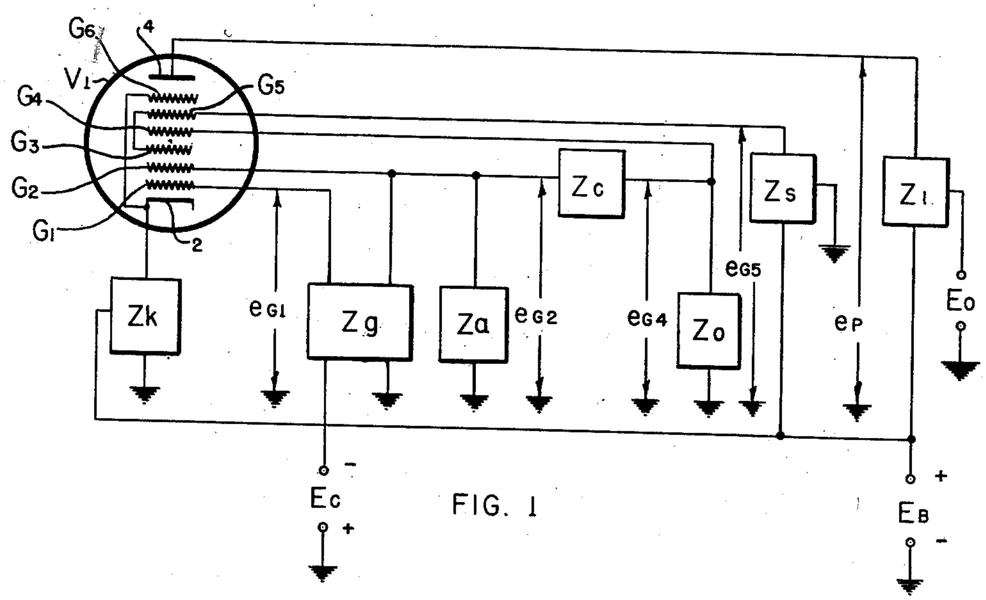
Figs. 1A and 1B are fragmentary reproductions of the schematic of Fig. 1, but showing $Zg$ connected respectively to the anode of tube $V_1$ and to the screen grids $G_3$ and $G_5$.

The circuit of the present invention involves the use of but a single vacuum tube $V_1$, which is here illustrated as having tube elements including a cathode 2, a plate 4, and a plurality of intermediate electrodes comprising a tube control grid $G_1$, oscillator elements comprising an oscillator anode $G_2$ and an oscillator control grid $G_4$, as well as screen grids $G_3$ and $G_5$, and suppressor grid $G_6$. Tubes having the standard designations 7A8, 6A8 and 7B8 have been found to be exceedingly suitable for use in this circuit, but other tubes which can perform the functions hereinafter to be described may be substituted in their place. A plurality of biasing circuits for the tube elements are provided, these including $Zk$ for the cathode, $Za$ for the oscillator anode $G_2$, $Zo$ for the oscillator control grid $G_4$, $Zs$ for the screen grids $G_3$ and $G_5$, and $Z_1$ for the tube anode 4. $E_B$ represents a positive biasing voltage so chosen in conjunction with the biasing circuits as to cause negative transconductance to exist between the oscillator anode $G_2$ and the oscillator control grid $G_4$. A coupling circuit $Zc$ is provided between the oscillator anode $G_2$ and the oscillator control grid $G_4$, the impedance $Zc$ including a capacitor $C_1$. $Ec$ represents a suitable voltage source which applies a voltage to the tube control grid $G_1$, this voltage being variable by any convenient means between zero and negative quantities. The various impedances are so designed, as shall become clear hereafter, that the voltage $Eo$, the output voltage of the circuit, has a frequency which is determined by and varies with the magnitude of the negative bias applied to $G_1$ by $Ec$. In discussing the operation of the circuit, $Ec$ will generally be considered as having a definite value, and it will be noted that for different values of $Ec$, the frequency of $Eo$ will differ. Consequently, if a varying voltage is applied to $Ec$ voltage, the amplitude of which is, for example, proportional at all times to the amplitude of a given sound, variations in $Ec$ determined by the frequency of the sound will be reflected in corresponding variations in the frequency of $Eo$. By this means, the frequency of $Eo$ will be proportional to the amplitude of the sound intelligence, and consequently $Eo$ will be frequency modulated by that sound.

The condenser $C_1$ which forms a part of $Zc$, and more particularly the charge and discharge rate of that condenser, determines the frequency of the output voltage $Eo$. It accomplishes this result by modulating the electron flow within the tube $V_1$ between its cathode 2 and its plate 4, the frequency of this modulation being reflected in a corresponding frequency change at $Eo$.

As a further and very important feature, it has been found that if the tube control grid $G_1$ be coupled to any one of the other tube elements, as by $Zg$, the effect of variations in $Ec$ on the frequency of $Eo$ is intensified and modified in various ways, depending upon the circuit design. The most marked effect attendant upon this coupling is a highly increased sensitivity of frequency response, that is to say, the curve of frequency against $Ec$ becomes considerably steeper.

In Fig. 1, $Zg$ is shown as connected to $G_2$, but it may instead optionally be connected to any of the other tube elements, different effects being observed in each case. Thus in Fig. 1A $Zg$ is shown as connected to the anode 4 of the tube, in Fig. 1B $Zg$ is shown as connected to the screen grids $G_3$ and $G_5$, and in Fig. 11 $Zg$ is shown as connected to the oscillator control grid $G_4$.

The symbols $e_{g1}$, $e_{g2}$, $e_{g4}$ and $e_p$ represent respectively the instantaneous values of voltage on $G_1$, $G_2$, $G_4$ and plate 4 respectively.

Figure 2A:
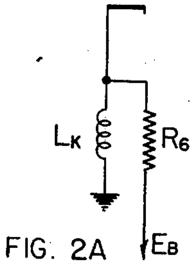
Figs. 2A, 2B and 2C represent alternative embodiments of $Zk$ of Fig. 1.
Figure 2B:
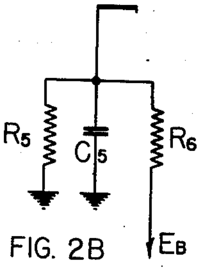
Figure 2C:
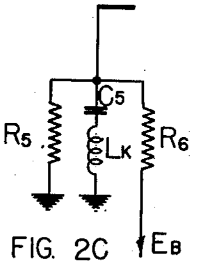

Figs. 2A, 2B and 2C illustrate three suggested circuits for providing the cathode 2 with a bias, best operation of the circuit occurring when such bias is applied. All of these embodiments of $Zk$ are well-known to the art, and it further will be apparent that if $Zk$ is omitted, a constant negative bias applied to $G_1$ will achieve the same end result. In all of the circuits shown in Figs. 9 through 12, a $Zk$ corresponding to Fig. 2B has been employed, but this is merely a matter of choice.

Figs. 4A, 4B, 4C and 4D are illustrative of some of the various forms which $Za$ may take. The presence of $C_8$ in Figs 4B and 4D modifies the wave shape of $e_{g2}$ so that, as will be explained, $Zg$ may cause a phase shift to take place between $e_{g1}$ and $e_{g2}$. The circuits of Figs. 9 and 11 employ the $Za$ of Fig. 4A, while the circuit of Fig. 10 employs the $Za$ of Fig. 4B. The circuit of Fig. 12 employs a $Za$ different from any of those illustrated in Fig. 4.

Figure 9:
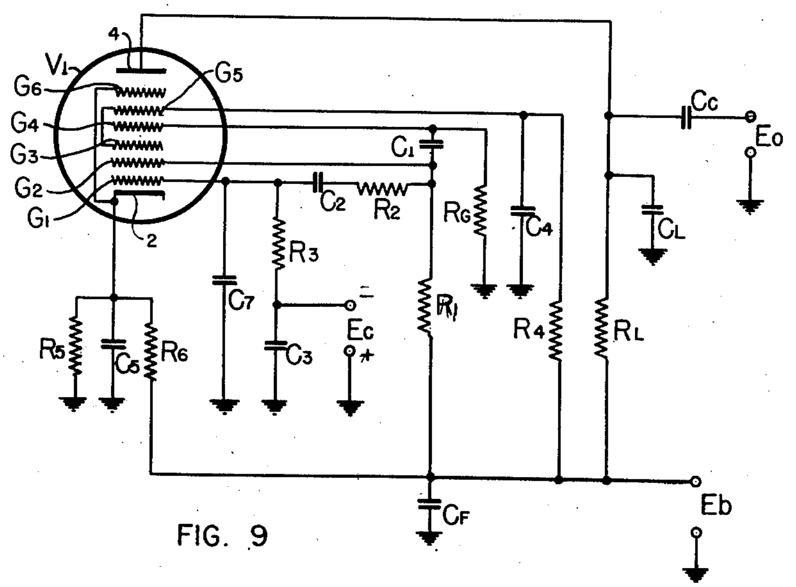
Figs. 9, 10, 11 and 12 represent various specific embodiments of the generalized circuit of Fig. 1, employing various combinations of the impedances shown in Figs. 2 through 8.
Figures 1A, 10:
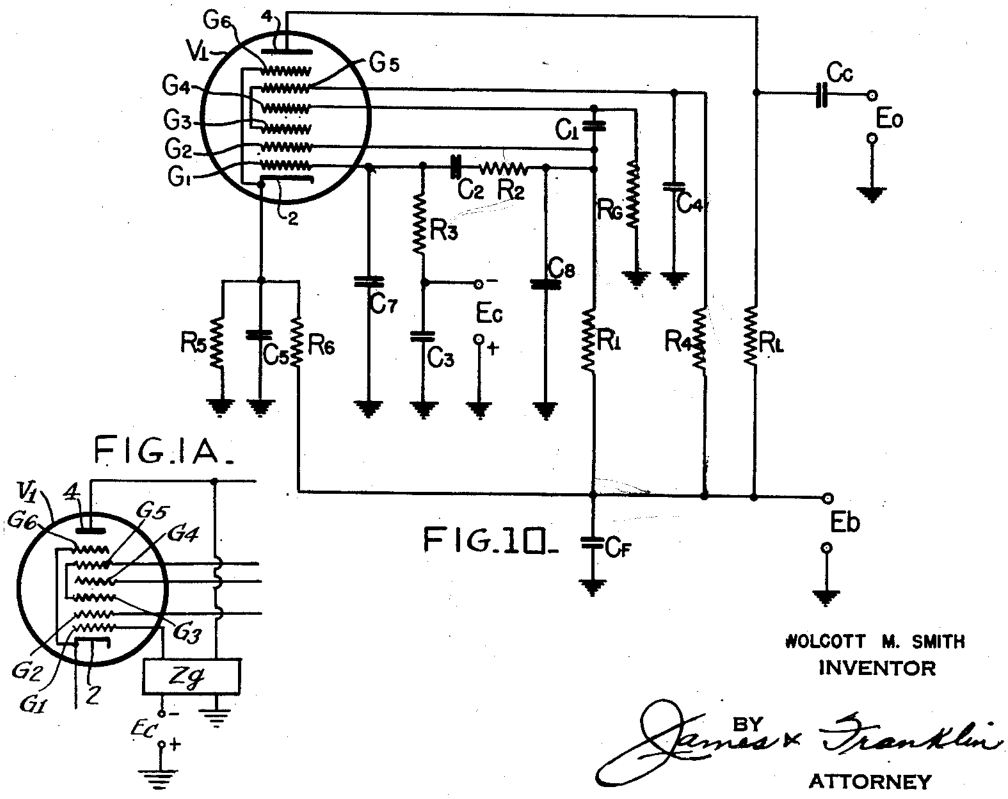
Figures 1B, 12:
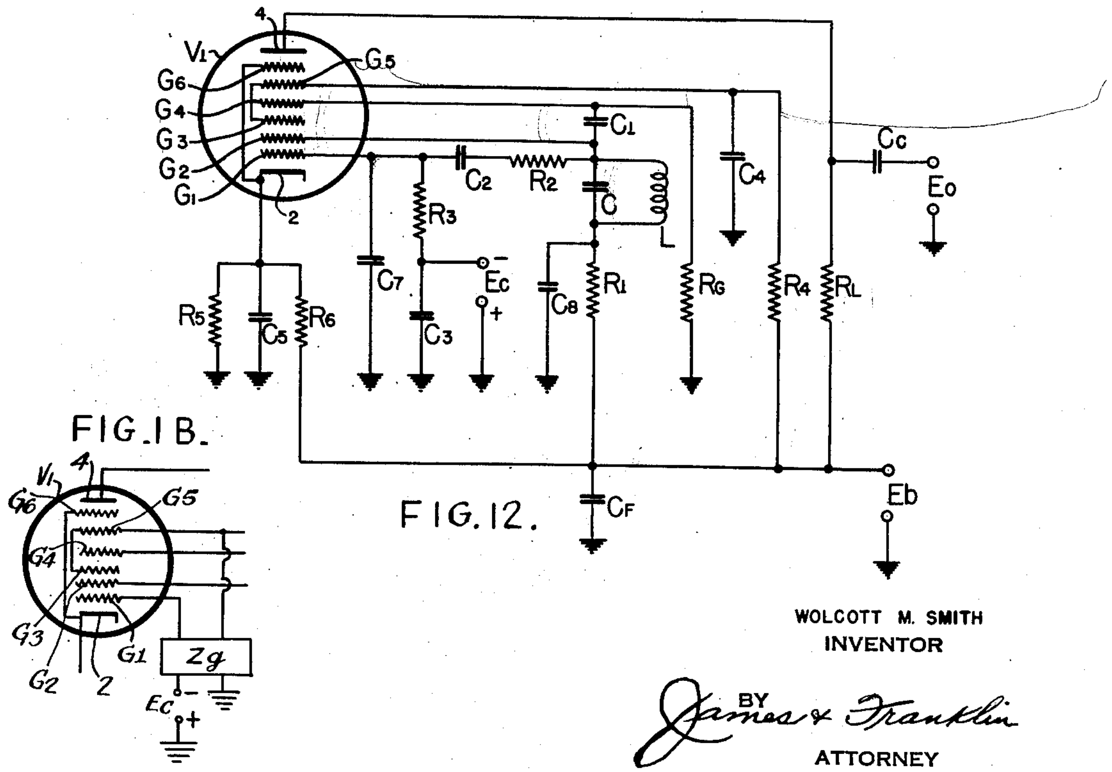

Figs. 6A, 6B, 6C and 6D represent various embodiments of $Zo$. Figs. 9, 10 and 12 employ the $Zo$ of Fig. 6A, while Fig. 11 employs the $Zo$ of Fig. 6D. The latter embodiment defines a parallel resonant circuit having a natural frequency of oscillation. The presence of such a circuit either in $Zo$, as in Fig. 11, or in $Za$, as in Fig. 12, has a very marked effect on the operation of the circuit, the current and voltage in the oscillatory circuit assuming a substantially sinusoidal shape, thus facilitating controlled phase shift by $Zg$, and the stiffness of the oscillatory circuit modifying the frequency variations of the overall circuit.

Figure 5A:
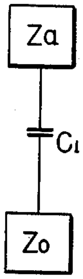
Figs. 5A, 5B, 5C and 5D represent alternative embodiments of $Zc$ of Fig. 1.
Figure 5B:
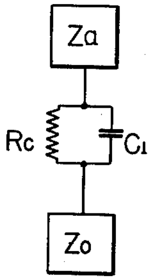
Figure 5C:
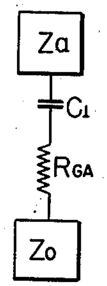
Figure 5D:
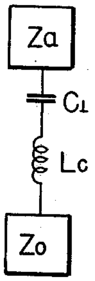
Figure 6A:
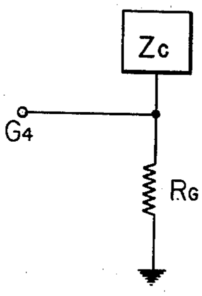
Figs. 6A, 6B, 6C and 6D represent alternative embodiments of $Zo$ of Fig. 1.
Figure 6B:
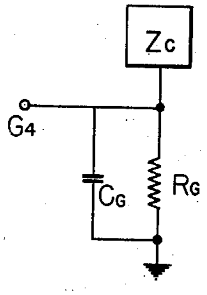
Figure 6C:
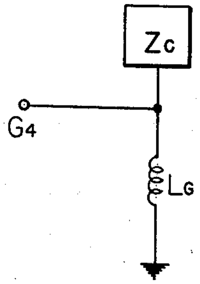
Figure 6D:
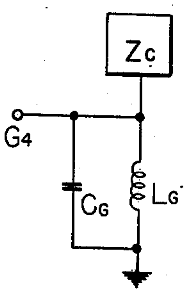
Figure 7A:
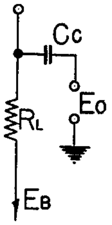
Figs. 7A, 7B, 7C and 7D represent alternative embodiments of $Z_L$ of Fig. 1.
Figure 7B:
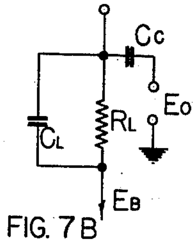
Figure 7C:
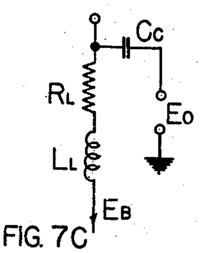
Figure 7D:
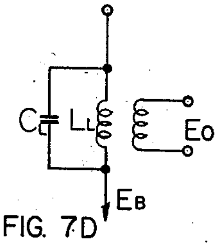

Figs. 5A, 5B, 5C and 5D illustrate some of the various forms which $Zc$ may take. It will be noted that a condenser $C_1$ is common to all of these forms, this condenser serving to control the frequency of $Eo$ by the time it takes to charge and discharge. In Figs. 9 through 12, the $Zc$ of Fig. 5A is employed.

Figs. 7A, 7B, 7C and 7D represent some of the various forms which $Z_1$ may take, this impedance serving not only to bias or apply high positive potential to the tube anode 4, but also serving to couple the output of the tube $V_1$ to $Eo$. The embodiments of Figs. 7A, 7B and 7C employ the capacitive coupling of $C_c$, while the embodiment of Fig. 7D employs inductive coupling.

Figure 8A:
Figs. 8A and 8B represent alternative embodiments of $Zs$ of Fig. 1.
Figure 8B:
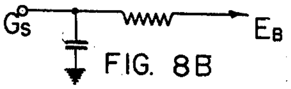

Figs. 8A and 8B are illustrative of various embodiments of $Zs$, the biasing impedance for the screen grids $G_3$ and $G_5$. In Figs. 9 through 12, the embodiment of Fig. A is used throughout.

The various impedance designs illustrated in the above discussed figures are but typical of circuit designs which may be employed in accordance with this invention. Whichever of the specific embodiments is employed is in many cases a matter of mere choice and circuit design well within the ken of those skilled in the art. This is particularly true with respect to the embodiments of $Zk$, $Zs$ and $Z_1$. Certain other of the choices will affect the operation of this circuit in manners hereafter to be described.

The operation of the circuit without $Z_g$ and with $G_1$ connected directly to $Ec$ will now be described. For purposes of illustration, this description will be carried out with reference to Fig. 9, it being assumed that $R_2$ is infinite, and that therefore no coupling exists between $G_1$ and $G_2$, and it being further assumed that $C_7$ and $R_3$ are absent from the circuit. The oscillatory portion of this circuit is made up by $Zo(Rg)$, $Zc(C_1)$, and $Za(R_1)$. It will be noted that this oscillatory circuit is made up exclusively of resistive and capacitive elements, this particular circuit arrangement producing at $Eo$ a succession of sawtooth pulses. If $C_L$ be omitted, these pulses will assume a square shape. It will further be assumed that $G_1$ is at ground potential.

$Eb$, via $R_1$, applies a positive potential to $G_2$, and many of those electrons which pass $G_1$ are attracted to $G_2$ and impinge thereon, thus decreasing the positive potential of $G_2$ and consequently decreasing the attraction it exerts on subsequent electrons. These electrons attracted to $G_2$ pass through $R_1$ thereby causing a voltage reduction at $G_2$ which is coupled to $G_4$ through $C_1$ causing $G_4$ to become more negative, $G_4$ thus decreasing the flow of electrons through the tube to the plate 4, which in turn decreases electron flow through $R_L$ practically to zero so that $e_p$ approaches the value of $E_B$. When $G_2$ has accumulated so many electrons that subsequent electrons are no longer attracted to it, the charging of $C_1$ will cease, and electrons will leave $G_4$ via $R_G$, the condenser $C_1$ thus discharging. The two grids $G_2$ and $G_4$, and particularly $G_4$, will therefore each become more positive, and thus the electron flow through $V_1$ will increase and the current flow through $R_L$ will increase, causing a corresponding decrease in the amplitude of $e_p$, the variation in $e_p$ being transmitted via $Cc$ to $Eo$. When $G_2$ has become positive enough to attract electrons again, the voltage drop through $R_1$ caused by the leakage of electrons from $G_2$ will once again cause $G_4$ to become more negative, and hence the cycle will repeat.

Figure 18:
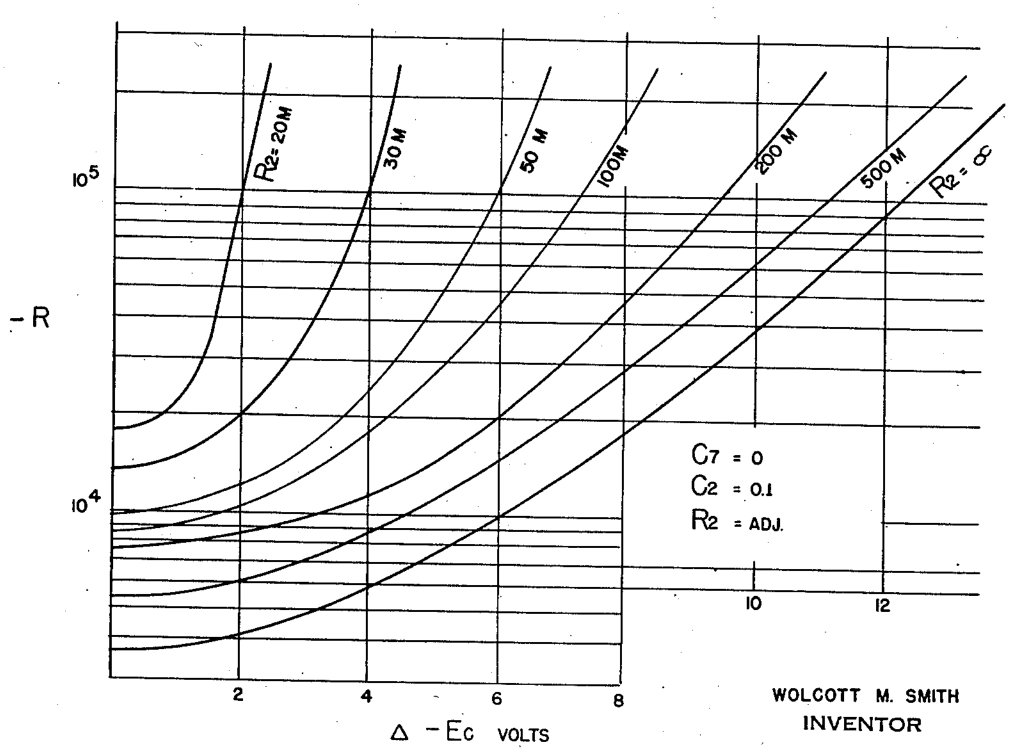
Fig. 18 is a graph showing the variation in $-R$ as $Ec$ is varied for various values of $R_2$.

The rapidity with which these cycles occur will be determined by the values of $Zo$, $Zc$ and $Za$, and by the negative transconductance of the tube. The impedances are fixed by circuit design, but the value of transconductance may be varied with $Ec$, a typical case being illustrated by the lowermost curve of Fig. 18 labeled $R_2=\alpha$. It will be noted from that curve that as $Ec$ increases (becomes more negative), the value $-R$ increases. $-R$ varies inversely as the transconductance between the grids $G_2$ and $G_4$, and is experimentally determined by decreasing $Rg$ until oscillation just ceases. This variation in $-R$ arises from the tube design, probably in the following manner: As $Ec$ becomes more negative, fewer and fewer electrons are available for passage through $V_1$. The smaller the number of electrons available, the less relatively negative must $G_2$ and $G_4$ be charged in order to cut off electron flow through $V_1$. Hence the fewer the electrons available the lower the potential to which $C_1$ must be charged in order to cut off electron flow. The lower the potential to which $C_1$ need be charged, the less time that charging will take up, and the less will be its discharge time. The less the charging and discharging time of $C_1$, the more variations will take place in the potential of $G_2$ and $G_4$ per unit time, and hence the greater will be the frequency of those oscillations, thus giving rise to an increased frequency in $Eo$. Thus a variation of $Ec$ varies the transconductance of the tube which varies the charge and discharge rate of the capacitor $C_1$, this in turn varying the frequency of output.

The circuit as thus far described therefore provides a simple arrangement in which the frequency of the voltage $Eo$ may be varied merely by changing the voltage $Ec$.

Figure 3A:
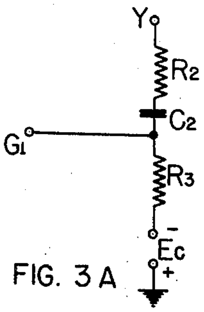
Figs. 3A, 3B, 3C and 3D represent alternative embodiments of $Zg$ of Fig. 1.
Figure 3B:
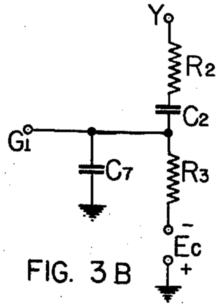
Figure 3C:
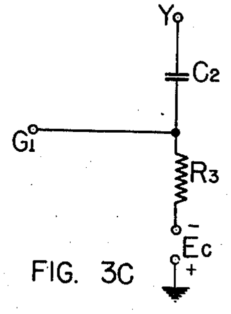
Figure 3D:
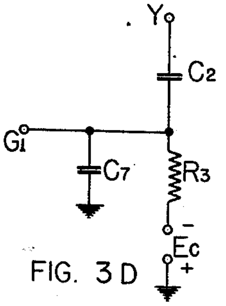

In order to modify or to intensify this effect, it has been found desirable to impress a voltage $e_{g2}$, $e_{g4}$, $e_{g5}$, or $e_p$ on $G_1$. This may be accomplished by addition of impedance elements $Zg$ to the circuit, this latter impedance serving to couple $G_1$ with one of the other tube elements. Confining our attention again to Fig. 9, and assuming that $C_7=0$, we find a $Zg$ employed which corresponds to Fig. 3A. Figs 3B, 3C and 3D represent alternative embodiments for $Zg$. Y in these figures represents a connection to any of the other tube elements. $Zg$ is here shown as coupling $G_1$ to $G_2$. This coupling has the effect, in the circuit now under discussion in which the oscillatory portion of the circuit is composed exclusively of resistive and capacitive elements, of intensifying the effect of $Ec$ on the frequency by what may be termed regenerative action. This is apparent from a study of the family of curves in Fig. 18. It is there seen that as the value of $R_2$ decreases, thus increasing the coupling effect between the two grids, not only does $-R$ increase for a given value of $Ec$, thus leading to a higher frequency, but the slope of the curve markedly increases, thus giving rise to a greater change of frequency for a given variation in $Ec$. This effect occurs because in the circuit now under discussion $e_{g1}$ will be in phase with $e_{g2}$, and hence $e_{g1}$ will affect the frequency in a way similar to $Ec$. Thus, comparing curves 1 and 4 of Fig. 14, curve 1 representing a circuit in which $e_{g1}$ is taken from $G_2$ and curve 4 representing a case in which $e_{g1}=0$, it will be noted that for any given value of $Ec$ the frequency of curve 1 is higher than the frequency of curve 4.

Figure 14:
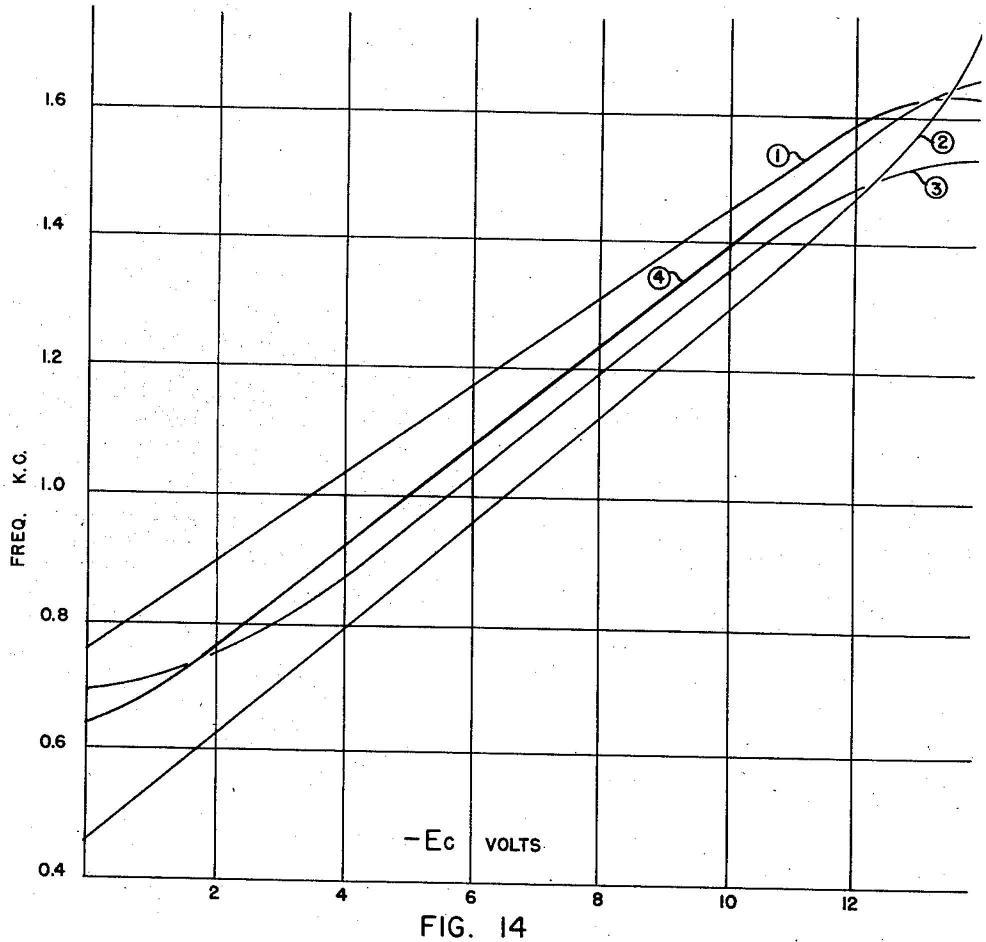
Fig. 14 illustrates the change in frequency of various circuits as the imput voltage $Ec$ is varied.

If in this circuit $Zg$ be connected to $G_4$, a different result is observed, such a connection giving rise to a reduction in frequency. Curve 2 of Fig. 14 illustrates this. It is believed that this effect may be explained as follows: Because of the presence of $C_1$, the voltage $e_{g4}$ has a wave shape different from $e_{g2}$, oscilloscope observations indicating that it contains a positive surge immediately following the negative surge. These surges when applied to $G_1$ apparently reduce electron flow while $G_2$ is attempting to acquire electrons, and to increase electron flow when $G_2$ no longer can use them. The reduced electron flow increases the time necessary for $C_1$ to charge $G_4$ to the value necessary to cut down the later increased electron flow through the tube $V_1$. Thus the frequency is decreased.

Figure 13:
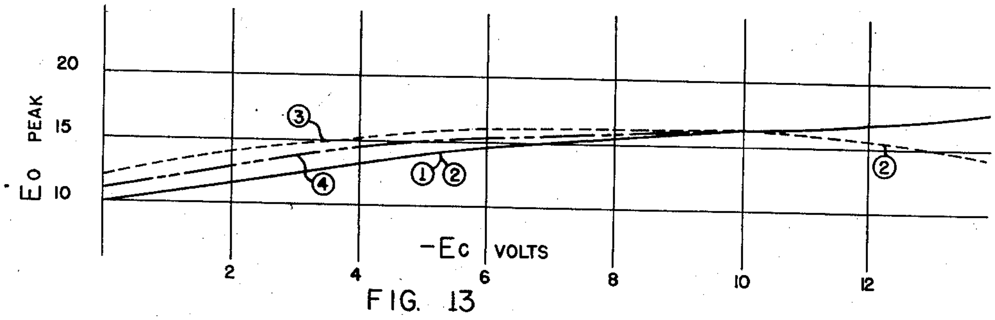
Fig. 13 is a graph showing the variation in peak amplitude of the output voltage of various circuits as the input voltage $Ec$ is varied.

If $Zg$ is connected to the tube anode 4 (curve 3 of Fig. 14), the same frequency-decreasing effect is observed as was the case when $Zg$ was coupled to $G_4$, except that the magnitude of the effect is somewhat decreased. This effect also is thought to be due to the variation in wave form between $e_p$ and $e_{g2}$. Connecting $Zg$ to the tube anode 4 has been found to have the additional effect of increasing the frequency stability of the circuit, making the oscillator as stable as any good L–C or inverse-feedback stabilized oscillator. It is notable that better amplitude stability is obtained with $Zg$ coupled to the tube anode 4 (curve 3 of Fig. 13). It will be noted that when $e_{g1}$ is obtained from $e_p$ the output voltage $Eo$ exhibits less variation than for the other curves, this amplitude stability being equal to that obtained with L–C and stabilized feedback oscillators, while still preserving an excellent ratio of $\Delta F$ to $\Delta Ec$. The total output variation is but 40% in spite of the extreme range of frequency control, all of the curves of Fig. 14 having a slope of approximately 8% $Fc$ per volt of $Ec$ where $Fc$ is the center frequency of the linear portion of these curves. Prior systems achieve a slope of approximately 2%, and the improvement which this circuit represents over prior circuits, even when $Zg$ is omitted (curve 4) will be apparent from this comparison.

$Zg$ may also be connected to $G_5$, the frequency variation effect then approximating that of curve 3 of Fig. 14. However, the wave shape of $e_{g5}$ is apparently such that the amplitude stability achieved when $Zg$ is connected to the tube anode 4 is not achieved in this case.

In the circuit as thus far described, $e_{g1}$ was effectively in phase with the $e_{g2}$ except when voltages having unusual wave shapes were employed. It has been found that various desirable effects may be produced by forcing $e_{g1}$ out of phase with $e_{g2}$, either leading or lagging, the effects being different when $e_{g1}$ leads $e_{g2}$ than when it lags. Thus if the $Zo$ of Fig. 6D be employed in the circuit, this impedance consisting of $L_G$ and $C_G$ connected in parallel, and if $Za$ retain the form of Fig. 4A (Fig. 11), or if $Zo$ takes the form of Fig. 6A while $Za$ contains a parallel resonant circuit (Fig. 12), these arrangements being typical of many which could be made in which the oscillatory portion of the circuit has a resonant frequency of vibration so that the current therein and therefore the voltage assumes at least an approximately sinusoidal wave form, $e_{g1}$ may be caused, by $Zg$, to differ in phase from $e_{g2}$. The degree of this phase difference may be controlled at will by design of $Zg$ in a manner well-known to the art.

When $e_{g1}$ leads $e_{g2}$, the variations in electron flow past $G_2$ precede its demand for electrons. Thus when $G_2$ most wants electrons, the supply of electrons is not maximum, but is decreasing, while when $G_2$ no longer wants electrons the flow of electrons is increasing. This tends to make $Zc$ take longer to become fully charged and discharged, since the electrons available during the upswing of each cycle tend to prevent this change in $G_2$, while the surge of electrons available during the downswing of each cycle always occurs ahead of the voltage reduction at $G_2$, thereby tending to prevent reduction in $e_{g2}$. The final result of these trends is to force each cycle to require a longer period, thus resulting in a reduction of frequency.

When $e_{g1}$ lags $e_{g2}$ the effect is just the opposite. The electrons available during the upswing of each cycle are insufficient and hence tend to cause $e_{g2}$ to rise more rapidly, while the increase in available electrons during the downswing of each cycle tends to speed up the reduction of $e_{g2}$. The final result of these trends is to force each cycle to have a shorter duration, thus leading to an increase in frequency.

The action of Ec in the sinusoidal version of this oscillator now under discussion apparently differs from its action when a pulse-type oscillator in which the oscillatory circuit is composed exclusively of resistive-capacitive elements is employed. Variation of Ec alone without coupling has been found to change the frequency of Eo only very slightly, this probably being due to the stiffness of the oscillatory circuit itself. It is believed that the effect of Ec in this case may be explained as follows: The voltage of $G_1$ exercises primary control over the number of electrons available for passage through $V_1$. As the voltage of $G_1$ becomes more negative, the number of electrons available decreases, and the speed of those electrons which pass $G_1$ is also decreased. As Ec and therefore $G_1$ become more negative, the effect which $e_{g1}$, the coupled voltage, has on the electron flow through the tube also decreases. In this way Ec controls frequency by control of the per cent modulation due to $e_{g1}$ of the electron stream passing $G_1$.

Figure 15:
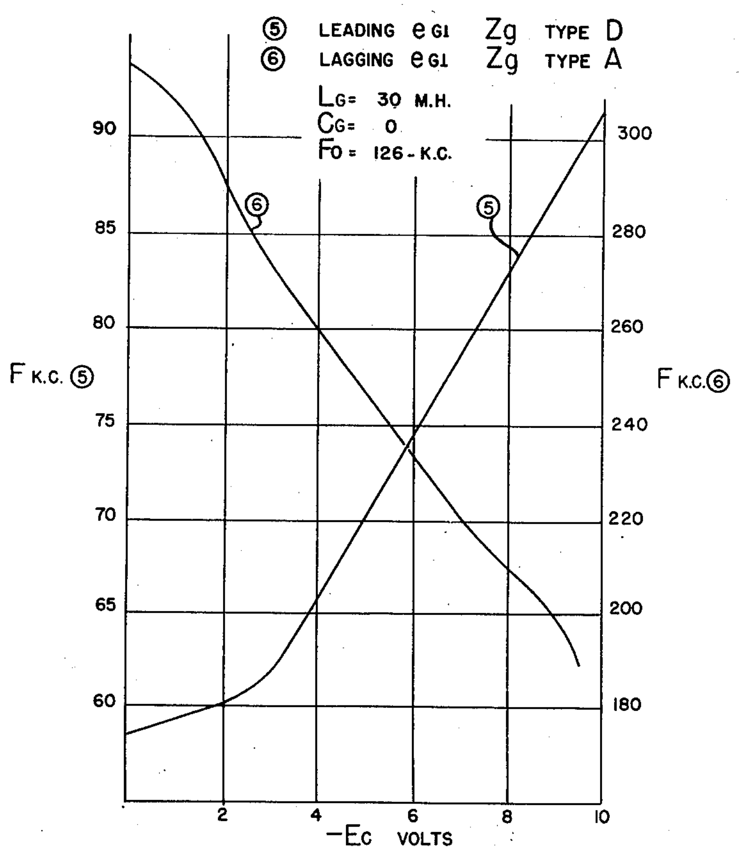
Figs. 15, 16 and 17 are similar to Fig. 14, but relate to different circuits.
Figure 16:
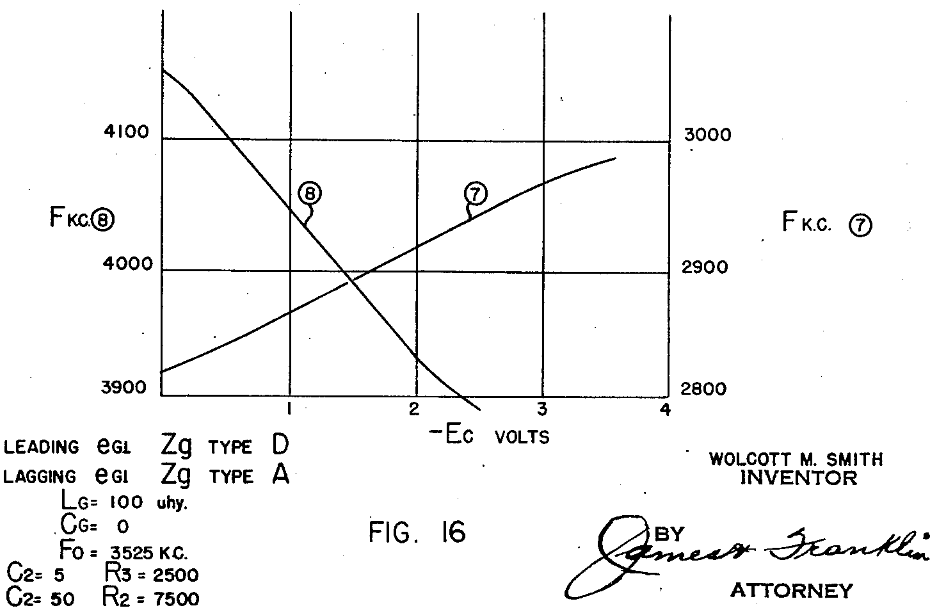
Figure 17:
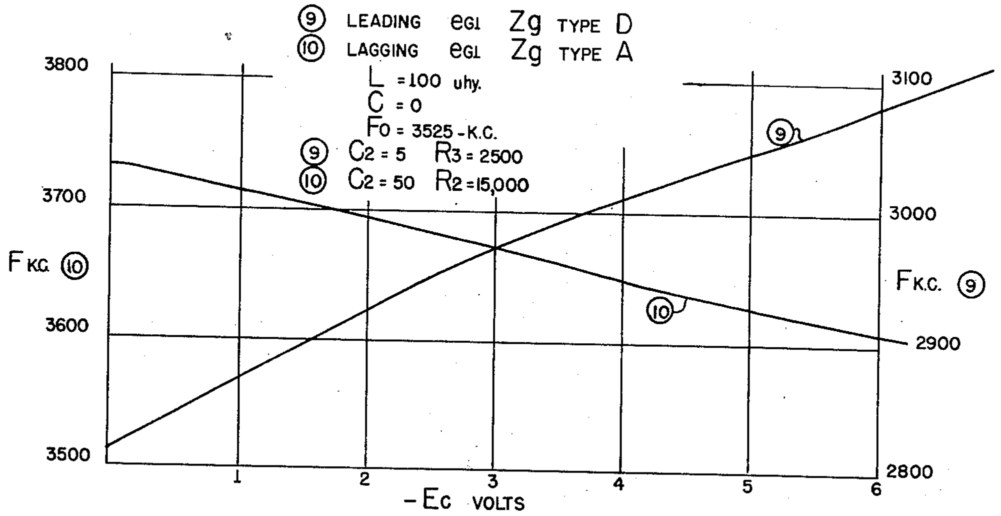

Figs. 15, 16 and 17 illustrate these effects. In Fig. 15, curve 5 represents the results obtained in a circuit in which Z*g* corresponds to Fig. 3D (Fig. 12). $C_7$, which may either represent a separate circuit element or the inherent interelectrode capacitance of the tube $V_1$ between $G_1$ and the cathode 2, further modifies $e_{g1}$ over the effect thereon of the other elements of Z*g*. In this case, it is noted that as Ec increases (becomes more negative), the frequency increases. When Z*g* takes the form of Fig. 3A (Fig. 11), $e_{g1}$ is caused to lag $e_{g2}$ (see curve 6), and hence as Ec increases (becomes more negative), the frequency decreases. Marked linearity of the curves is obvious.

The circuit constants for the curves of Fig. 15 were so chosen that oscillation took place at relatively low rates (*Fo*=126 kc.). With different circuit constants curves 7 and 8 were developed (*Fo*=3525 kc.), these curves evidencing a very high frequency sensitivity to variation in Ec. Fig. 17 compares curves 9 and 10, somewhat different circuit constants being employed.

All of these curves show a marked linearity over relatively wide variations in Ec, and show exceedingly high frequency sensitivities with regard to varations in Ec.

It will be apparent that in accordance with the considerations above discussed, various specific circuits may be formed from the generic circuit of Fig. 1. By way of exemplification only, and not by way of limitation, four such circuits are illustrated in Figs. 9 through 12. The circuit of Fig. 9 is of the resistive-capacitive, or pulsating type. In this circuit, Z*k* takes the form of Fig. 2B, Z*g* takes the form of Fig. 3B, Z*a* takes the form of Fig. 4A, Zc takes the form of Fig. 5A, Zo takes the form of Fig. 6A, Z*s* takes the form of Fig. 8B, and $Z_L$ takes the form of Fig. 7A. $C_L$ causes the pulses of Eo to assume a sawtooth form, and if $C_L$ is omitted those pulses will assume a square shape. $C_3$ and C*f* are bypass condensers.

Figure 4A:
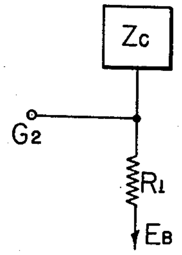
Figs. 4A, 4B, 4C and 4D represent alternative embodiments of $Za$ of Fig. 1.
Figure 4B:
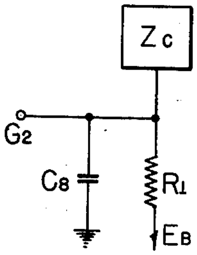
Figure 4C:
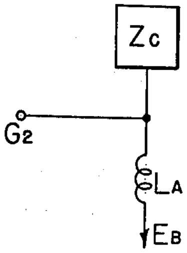
Figure 4D:
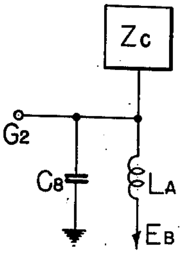

The circuit of Fig. 10 differs from that of Fig. 9 in omitting $C_L$ and in adding $C_8$ so that Zo takes the form of Fig. 4B. The presence of $C_8$ causes the voltage applied to $R_2$ to have a modified wave form such that Z*g* can impart a phase shift thereto, and therefore by suitable designing Z*g* any desired phase shift, and consequently any desired frequency-grid bias relationship may be obtained.

Figure 11:
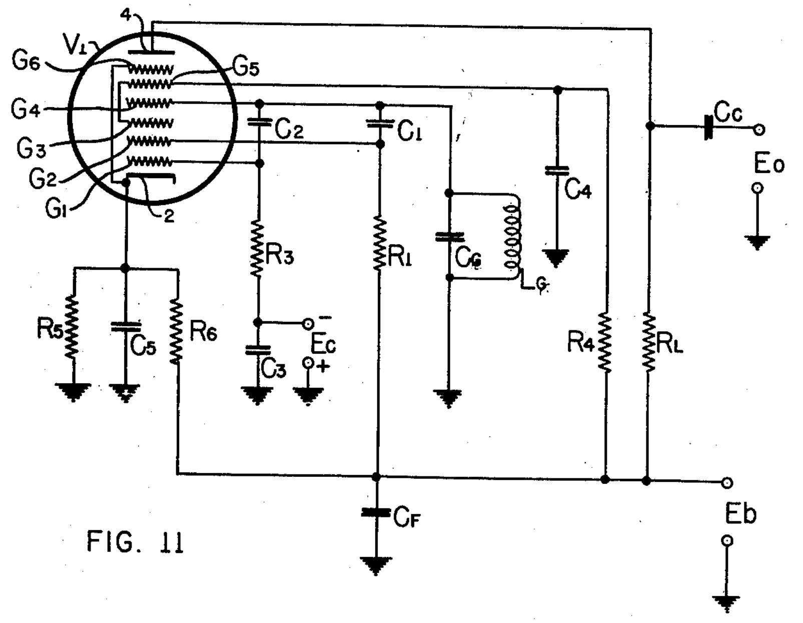

Figs. 11 and 12 are representative of circuit designs in which the oscillatory part of the circuit has a resonant frequency. Fig. 11 shows the resonant circuit, composed of $L_G$ and $C_G$, as part of Zo, thus corresponding to Fig. 6D. Fig. 11 also shows $G_1$ coupled to the oscillator control grid $G_4$, the coupling impedance Z*g* taking the form of Fig. 3C. Fig. 12 has the resonant circuit portion consisting of L–C as part of Z*a*, it being added to the Z*a* of Fig. 4B to define a Z*a* not elsewhere illustrated in the drawings. A comparison of Figs. 11 and 12 indicates that whether the resonant portion of the circuit forms part of Zo or Z*a*, essentially the same effects are produced, these effects differing in degree and/or sign only, and not in kind.

From the above description, the true flexibility and adaptability of the circuit of the present invention will be apparent. By combining impedances into the arrangement of Fig. 1, the application of a varying voltage Ec to the tube control grid $G_1$ of tube $V_1$, which is biased to a condition of negative transconductance, will so modulate the electron flow through the tube as to cause it to vary at a frequency which itself varies to follow the changes in the voltage Ec. This effect obtains even if Z*g* is absent, the presence of Z*g* intensifying the effect. It is to be noted that this effect obtains, even though no part of the circuit may be said to have a resonant frequency of vibration. When Z*g* is present, it may couple $G_1$ to any one of the other electrodes of the tube, and when that coupling obtains the output frequency may be controlled by varying either the amplitude, wave form, or phase shift of the coupled voltage $e_{g1}$, these changes being obtained by choice of proper circuit design in a manner well-known in the art. When the oscillatory portion of the circuit has a resonant frequency, the output frequency may still be varied by changing the voltage Ec.

The circuit here described is of exceedingly high sensitivity, as compared with previous circuits which accomplish the same end, this sensitivity being achieved without loss of high output amplitude stability. The circuit employs but a single vacuum tube, is relatively simple, and requires no critical balancing or high precision of circuit components in order for it to work. It has been observed that the output from this circuit is exceedingly rich in harmonics, thus permitting frequency multiplication by the employment of suitable resonant and trap circuits in the output. This last mentioned factor materially extends the field of applicability of this circuit.

It will be apparent that many variations may be made in the specific circuit design, without departing from the spirit of the invention as set forth in the appended claims.

I claim:

1. A variable frequency oscillator comprising a vacuum tube having as tube elements a cathode, a plate, and at least three intermediate electrodes there-between constituting, in order from cathode to plate, a tube control grid, an oscillator anode, and an oscillator control grid, biasing circuits connected to said tube elements for maintaining said oscillator anode at a higher potential than said tube control grid and said cathode, said plate at a higher potential than any of the other tube elements, and said tube control grid at a potential sufficiently below that of said cathode so that negative transconductance exists between oscillator anode and oscillator control grid, a coupling circuit including a capacitor connected between the oscillator anode and oscillator control grid, a second coupling circuit substantially non-frequency-discriminating over the frequency range of operation of the oscillator and including a capacitor connected between the tube control grid and one of the tube elements other than the cathode and any tube element connected directly to the cathode, and additional means for independently varying the voltage applied to the tube control grid and thereby varying the frequency of oscillation and of said oscillator.

2. The variable frequency oscillator of claim 1, in which the coupling circuit to the tube control grid in conjunction with the biasing circuits for the oscillator anode and the oscillator control grid define a circuit which causes the voltage coupled to the tube control grid to differ in phase from the voltage of the oscillator anode.

3. The variable frequency oscillator of claim 1 in which said second coupling circuit is connected between the tube control grid and the oscillator anode.

4. The variable frequency oscillator of claim 1 in which said second coupling circuit is connected between the tube control grid and said oscillator control grid.

5. The variable frequency oscillator of claim 1 in which said second coupling circuit is connected between the tube control grid and the plate.

6. In the variable frequency oscillator of claim 1, a pair of connected tube elements defining a screen grid on either side of said oscillator control grid, a biasing circuit connected to said screen grid for maintaining it at a potential appropriate for functioning as a screen grid, said second coupling circuit being connected between the tube control grid and said screen grid.

7. The variable frequency oscillator of claim 1, in which the coupling circuit to the tube control grid in conjunction with the biasing circuits for the oscillator anode and the oscillator control grid define a circuit which is composed exclusively of resistive and capacitive elements.

8. The variable frequency oscillator of claim 1, in which the coupling circuit to the tube control grid in conjunction with the biasing circuits for the oscillator anode and the oscillator control grid together include an oscillatory circuit having a resonant frequency of vibration.

9. The variable frequency oscillator of claim 1, in which the biasing circuit for one of the oscillator elements comprises inductive and capacitive elements in parallel.

10. The variable frequency oscillator of claim 1, in which the oscillator circuit is so designed as to impart a substantially sinusoidal shape to the voltage on the oscillator elements and in which the tube control grid is coupled to one of the oscillator elements.

11. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid, and applying to said tube control grid substantially all of the frequency components, within the frequency range of the operation of the oscillator, of the varying voltage of one of said tube elements other than the cathode.

12. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid, and applying to said tube control grid the varying voltage of said oscillator anode.

13. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid, and applying to said tube control grid substantially all of the frequency components, within the frequency range of the operation of the oscillator, of the varying voltage of said oscillator control grid.

14. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid, and applying to said tube control grid substanially all of the frequency components, within the frequency range of the operation of the oscillator, of the varying voltage of said plate.

15. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid and applying to said tube control grid a varying voltage corresponding to that of one of said tube elements other than the cathode and any tube element connected directly to the cathode but differing in phase therefrom, said varying voltage including substantially all of the frequency components, within the frequency range of operation of the oscillator, of said tube element.

16. The method of varying the frequency of oscillation of the output of a vacuum tube having as tube elements a cathode, a plate, and a plurality of intermediate electrodes including a tube control grid and oscillator elements including an oscillator anode and an oscillator control grid, said method comprising causing negative transconductance to exist between the oscillator anode and oscillator control grid, maintaining an oscillatory condition between said oscillator anode and oscillator control grid, varying the voltage applied to the tube control grid, and applying to said tube control grid a varying voltage corresponding to that of the oscillator anode but differing in phase therefrom.

17. The method of varying the frequency of oscillation of the output of a vacuum tube having as tube elements a cathode, a plate, and a plurality of intermediate electrodes including a tube control grid, a screen grid, and oscillator elements including an oscillator anode and an oscillator control grid, said method comprising causing negative transconductance to exist between the oscillator anode and the oscillator control grid, maintaining an oscillatory condition between said oscillator anode and oscillator control grid, varying the voltage applied to the tube control grid, and applying to said tube control grid a varying voltage corresponding to that of said screen grid.

18. A variable frequency oscillator comprising a vacuum tube having as tube elements a cathode, a plate, and at least three intermediate electrodes therebetween constituting, in order from cathode to plate, a tube control grid, an oscillator anode, and an oscillator control grid, biasing circuits connected to said tube elements for maintaining said oscillator anode at a higher potential than said tube control grid and said cathode, said plate at a higher potential than any of the other tube elements, and said tube control grid at a potential sufficiently below that of said cathode so that negative transconductance exists between oscillator anode and oscillator control grid, a coupling circuit including a capacitor connected between the oscillator anode and oscillator control grid, a coupling circuit including a capacitor connected between the control grid and the oscillator anode, and additional means for independently varying the voltage applied to the tube control grid and thereby varying the frequency of oscillation of said oscillator.

WOLCOTT MARSH SMITH.

References Cited in the file of this patent

UNITED STATES PATENTS

| Number | Name | Date |
|---|---|---|
| 2,180,369 | Philpott | Nov. 21, 1939 |
| 2,226,561 | Herold | Dec. 31, 1940 |
| 2,393,717 | Speaker | Jan. 29, 1946 |
| 2,396,088 | Crosby | Mar. 5, 1946 |
| 2,412,782 | Palmer | Dec. 17, 1946 |

FOREIGN PATENTS

| Number | Country | Date |
|---|---|---|
| 563,421 | Great Britain | Mar. 8, 1944 |